E. G. Passmore,
Harvester Rake.

No. 53862.  Patented April 10, 1866.

Witnesses: Wm. Albert Steel, M. R. Delany

E. G. Passmore
By his Atty
W. Houston

UNITED STATES PATENT OFFICE.

E. G. PASSMORE, JR., OF PHILADELPHIA, PENNSYLVANIA.

IMPROVEMENT IN HARVESTERS.

Specification forming part of Letters Patent No. 53,862, dated April 10, 1866.

*To all whom it may concern:*

Be it known that I, EVERETT G. PASSMORE, Jr., of Philadelphia, Pennsylvania, have invented certain Improvements in Grain and Grass Harvesters; and I do hereby declare the following to be a full, clear, and exact description of the same, reference being had to the accompanying drawings, and to the letters of reference marked thereon.

My invention consists of certain devices, fully described hereinafter, whereby the cutting apparatus and the rake of a harvester may be started or stopped simultaneously, and whereby the rake may be readily adjusted in respect to the platform when the position of the latter is changed.

In order to enable others skilled in the art to make and use my invention, I will now proceed to describe its construction and operation.

Figure 1:
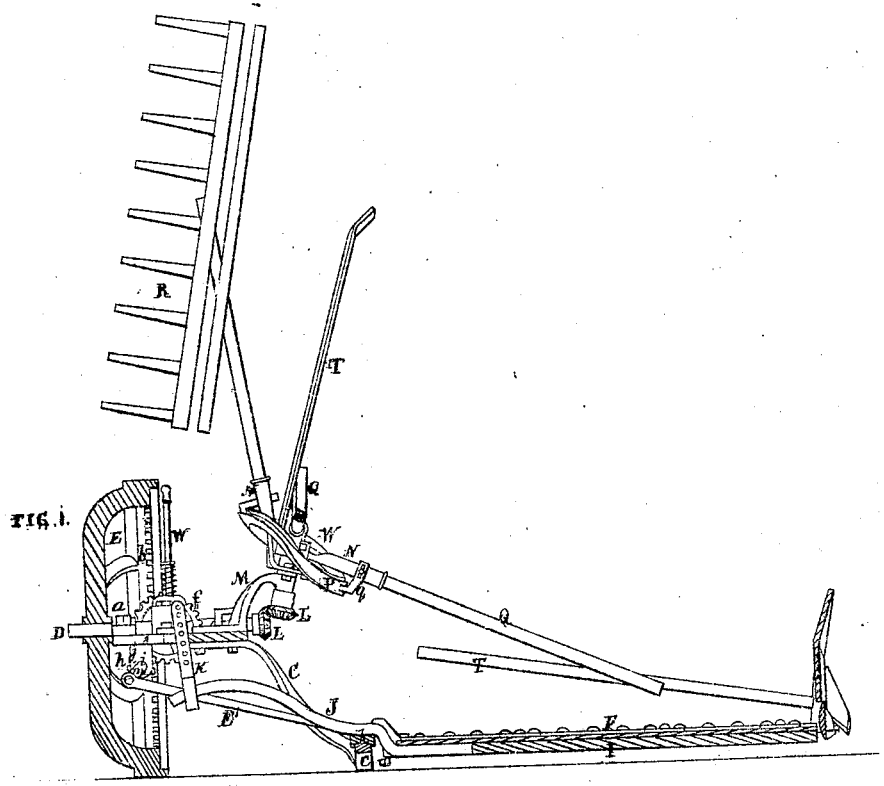
Figure 2:
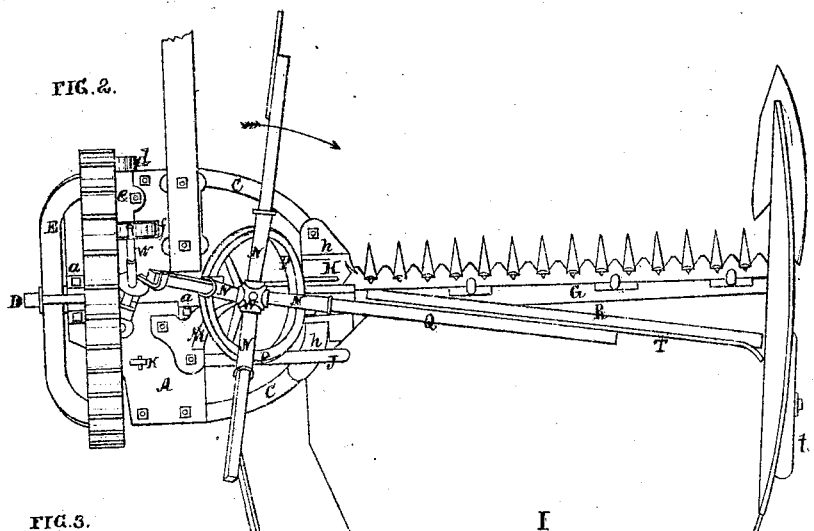

On reference to the accompanying drawings, which form a part of this specification, Figure 1 is a vertical section of my improved harvester; Fig. 2, a plan view, and Figs. 3 and 4 detached views of part of the machine drawn to an enlarged scale.

The frame of the machine consists of the plate A and the curved bracket C.

D is the main driving-shaft, which is arranged to turn and to slide longitudinally to a limited extent in boxes *a a*, secured to the plate A of the frame, the driving-wheel E being secured to this shaft, and this driving-wheel having on the inside teeth *l*, adapted to those of a pinion, *d*, on a shaft which turns in a box, *e*, secured to the said plate A, to which shaft is secured a wheel, *f*, gearing into a pinion, *h*, on a shaft, *i*, which turns in projections *j j* on the under side of the plate A, the shaft *i* having at one end a crank, *m*, to the pin of which is jointed one end of a rod, E', the opposite end of which is connected to the inner end of the cutter-bar F, in the peculiar manner fully described hereinafter.

G is the finger-bar, the inner end of which is secured to a plate, H, the latter being hinged to plates *h h*, secured to the bracket C, so that the finger-bar and cutters can be turned up to a vertical or nearly vertical position, as in other machines of this class.

The finger-bar and fingers, cutter-bar and cutters, and the platform I are similar to those of other harvesters.

A rigid bar, J, is secured at one end to the platform I, the opposite end passing through an eye in a bar, K, which projects through an opening in the plate A, the bar having a number of holes, into any of which a pin may be inserted.

Figure 3:
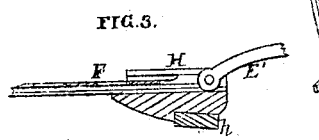
Figure 4:
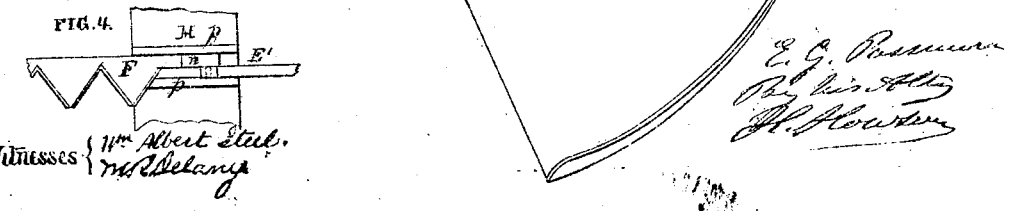

The cutter-bar F is thickened at the inner end, as seen in Figs. 3 and 4, and from this thickened end projects a pin embraced by the end of the connecting-rod E', both the rod and bar being guided by flanges *p p* on the plate H. By this arrangement the center of the pin to which the rod is jointed is brought nearer to the cutting-edges of the knives than in other harvesters, the joint in which is situated at a disadvantageous distance above the cutting-bar.

On the inner end of the driving-shaft D is a bevel-wheel, L, gearing into a similar wheel, L', on an inclined shaft, which turns in a bracket, M, secured to the plate A of the frame, and on the upper end of this shaft is a hub, W, to which are jointed the four arms N, each of which has an adjustable stud, *q*, the bent end of the latter projecting into the space between the flanges of the cam-wheel P, which is permanently secured to the bracket M. To each of the arms N is secured a rod, Q, and one or two of these rods are provided with a rake, R, while the others are provided with a simple bar, T.

W is a handle, by means of which the driving-shaft may be moved to and fro longitudinally. As the devices connected with this handle form no part of my present invention, and as they may be varied, it will suffice to observe that they are such that on moving the handle in one direction the driving-wheel is thrown out of gear with the pinion *d*, and the wheel L out of gear with the wheel L', and that on moving the handle in a contrary direction the said wheels are thrown into gear.

When the machine is used for moving purposes the platform with its bar J and the rake are removed, the lower end of the bracket C resting on the ground, so that the cutting apparatus may be as near the same as possible.

When used for cutting grain the platform is readjusted to the frame, the bar J being passed through the eye of the bar K, and the latter elevated so as to raise the cutter-bar to the desired height above the ground. This bar J is a most important feature of my invention, as it forms a rigid connection between the outer end of the platform and the frame of the machine, the latter bearing on the ground at two points only—namely, the driving-wheel and the outer wheel, t. At the same time the bar affords every facility for adjusting the cutting apparatus to and from the ground.

The curve of the cam-wheel P is such that the rakes R and bars T, as they revolve in the direction of the arrow, Fig. 2, are depressed in front of the cutters, pass over close to the platform, and rise after leaving the latter.

It is important that means should be afforded for readily adjusting the rake to any alteration in the position of the platform. This is accomplished by the studs $q$, which can be so adjusted on the arms N that the extent of the depressions of the rakes to suit that of the platform can be regulated at pleasure.

I wish it to be understood that I do not desire to claim, broadly, the combination of a system of revolving rakes with a stationary cam by which the altitude of the rakes is controlled; but

I claim as my invention and desire to secure by Letters Patent—

1. The sliding shaft D and its bevel-wheel L, gearing into a wheel, L', on the rake-shaft, in combination with the gearing herein described, or the equivalent to the same, for operating the cutters, the whole being arranged for the simultaneous stopping and starting of the cutting apparatus and rake, substantially as herein described.

2. The studs $q$, made adjustable on the arms N and adapted to the flanged cam, substantially as and for the purpose specified.

In testimony whereof I have signed my name to this specification in the presence of two subscribing witnesses.

E. G. PASSMORE, JR.

Witnesses:
 JOHN WHITE,
 W. J. R. DELANY.